(12) United States Patent
Breau et al.

(10) Patent No.: US 8,189,473 B1
(45) Date of Patent: May 29, 2012

(54) DYNAMIC OVERFLOW POOL ALLOCATION

(75) Inventors: Jeremy R. Breau, Kansas City, MO (US); Ray R. Doerr, Gardner, KS (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1358 days.

(21) Appl. No.: 11/775,016

(22) Filed: Jul. 9, 2007

(51) Int. Cl.
*H04L 12/26* (2006.01)
(52) U.S. Cl. .......................... 370/235; 370/412; 370/429
(58) Field of Classification Search ........................ None
See application file for complete search history.

(56) References Cited

U.S. PATENT DOCUMENTS

| | | | |
|---|---|---|---|
| 2003/0045287 A1* | 3/2003 | Taniguchi | 455/433 |
| 2005/0122946 A1* | 6/2005 | Won | 370/338 |
| 2007/0183426 A1* | 8/2007 | Daude et al. | 370/392 |
| 2007/0203999 A1* | 8/2007 | Townsley et al. | 709/207 |

* cited by examiner

*Primary Examiner* — Chirag Shah
*Assistant Examiner* — Salvador E Rivas

(57) ABSTRACT

Computer-readable media, systems, and methods for dynamic overflow pool allocation are described. In embodiments, a new session registration request is monitored for and, upon receiving the new session registration request, it is determined whether an existing pool associated with a home agent has crossed below a minimal threshold. In various embodiments, if it is determined that the existing pool has crossed below a minimal threshold, an overflow is obtained. In various other embodiments, it is determined whether an existing home agent pool has crossed a maximum threshold and, if so, it is determined whether at least one session remains using the overflow pool. In various other embodiments, if no sessions remain using the overflow pool, the overflow pool is returned.

15 Claims, 5 Drawing Sheets

DYNAMIC OVERFLOW POOL ALLOCATION

CROSS-REFERENCE TO RELATED APPLICATIONS

Not applicable.

STATEMENT REGARDING FEDERALLY SPONSORED RESEARCH OR DEVELOPMENT

Not applicable.

BRIEF SUMMARY

The present invention is defined by the claims below. Embodiments of the present invention solve at least the problems described herein by providing computer-readable media, systems, and methods for dynamic overflow pool allocation. The present invention, as described herein, has several practical applications in the technical arts including, without limitation, dynamically allocating an overflow pool to a home agent, determining when a home agent requires access to an overflow pool to maintain service, determining whet a home agent no longer requires access to an overflow pool to maintain service, and returning an overflow pool for accessibility to various home agents.

In a first aspect, a method in a mobile IP environment for dynamically allocating an overflow pool to a home agent is provided that includes monitoring for a new session registration request. Upon receiving a new session registration request, the method further includes determining whether an existing pool associated with the home agent has crossed below a minimal threshold. Further, if it is determined that the existing pool has crossed below a minimal threshold, the method includes obtaining an overflow pool.

In another aspect, a computerized system in a mobile IP environment for dynamic overflow pool allocation is provided that includes a monitoring component configured to monitor for a new session registration request, a minimal threshold component configured to determine, upon receiving the new session registration request, whether an existing pool associated with a home agent has crossed below a minimal threshold, and a requesting component configured to request an overflow pool. The system further includes a receiving component configured to receive the overflow pool and at least one database for storing information associated with a dynamic overflow pool allocation environment.

In yet another aspect, one or more computer readable media having instructions embodied thereon that, when executed, perform a method in a mobile IP environment for managing a dynamically allocated overflow pool associated with a home agent is provided, including obtaining an overflow pool, monitoring for a new session registration request and, upon receiving the new session registration request, determining whether an existing pool associated with the home agent has been exhausted. The method further includes, if it is determined that the existing pool has been exhausted, assigning a home agent IP address from the overflow pool.

It should be noted that this Summary is provided to generally introduce the reader to one or more select concepts described below in the Detailed Description in a simplified form. This Summary is not intended to identify key and/or required features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
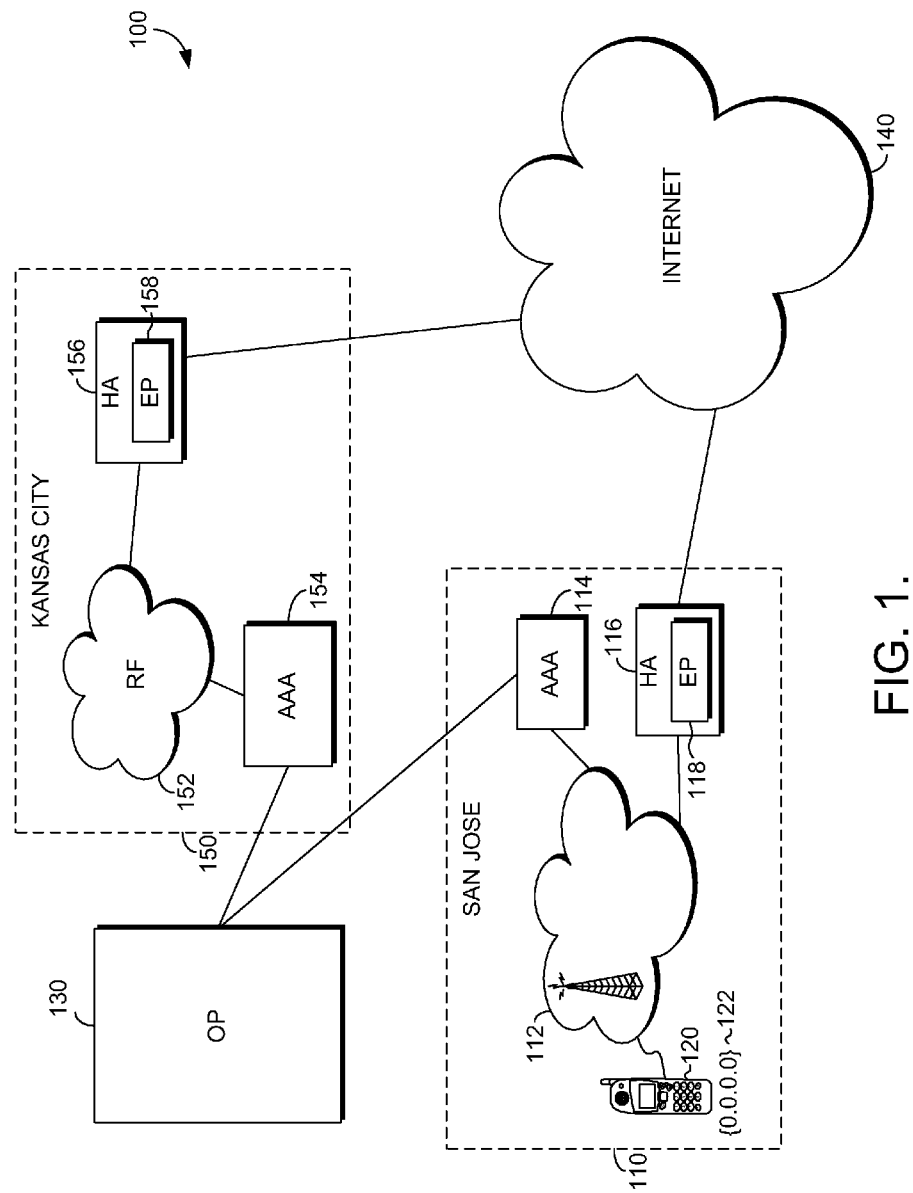
FIG. 1 is a block diagram of an exemplary operating environment illustrating a dynamic overflow pool allocation implementation, in accordance with an embodiment of the present invention.

The subject matter of the present invention is described with specificity herein to meet statutory requirements. However, the description itself is not intended to limit the scope of the patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of the individual steps is explicitly described.

Embodiments of the present invention provide systems, methods, and computer readable media for dynamic home agent pool allocation. The dynamic home agent pool allocation allows home agents to utilize an overflow pool of home agent IP addresses where the home agent is near capacity, due to increased usage from non-local mobile devices.

Acronyms and Shorthand Notations

Throughout the description of the present invention, several acronyms and shorthand notations are used to aid in the understanding of certain concepts pertaining to the associated systems and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| CDMA | Code Division Multiple Access |
| FA | Foreign Agent |
| DHA | Dynamic Home Agent |
| HA | Home Agent |
| HoA | Home Address |
| ICMP | Internet Control Message Protocol |
| IETF | Internet Engineering Task Force |
| IP | Internet Protocol |
| MIB | Management Information Base |

-continued

| | |
|---|---|
| MIP | Mobile IP |
| OID | Object Identifiers |
| RADIUS | Remote Authentication Dial-In User Service |
| RF | Radio Frequency |
| SNMP | Simple Network Management Protocol |

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Dynamic Overflow Pool Allocation

In various embodiments of the present invention one or more dynamically allocated overflow pools are used to solve the problems discussed herein. For instance, when a home agent is overloaded due to excessive non-local mobile devices requesting sessions, the home agent may access a overflow pool of IP addresses to assign to the non-local mobile devices.

In various embodiments, a new session registration request is monitored for and, upon receiving the new session registration request, it is determined whether an existing pool associated with a home agent has crossed below a minimal threshold. Further, in various embodiments, if it is determined that the existing pool has crossed below a minimal threshold, an overflow pool is obtained. While various embodiments discussed herein refer to a single overflow pool of IP addresses, it will be understood and appreciated by one of ordinary skill in the art that embodiments are not limited to a single overflow pool. For instance, without limitation, in various embodiments of the present invention two or more overflow pools may be available for dynamic allocation to various home agents. Similarly, embodiments discussed herein refer to a single existing home agent pool. Again, one of ordinary skill in the art will understand and appreciate that embodiments of the present invention are not limited to any particular existing pool configuration and the existing pool associated with a home agent may be a single pool or may be two or more pools of IP addresses.

Accordingly, in one aspect, the present invention is directed to a method for dynamically allocating an overflow pool to a home agent. The method includes monitoring for a new session registration request and, upon receiving the new session registration request, determining whether an existing pool associated with the home agent has crossed below a minimal threshold. Further, if it is determined that the existing pool has crossed below a minimal threshold, the method includes obtaining an overflow pool.

In another aspect, the present invention is directed to a computerized system for dynamic overflow pool allocation. The system includes a monitoring component configured to monitor for a new session registration request, a minimal threshold component configured to determine whether, upon receiving the new session registration request, an existing pool associated with a home agent has crossed below a minimal threshold, a requesting component configured to request an overflow pool, and a receiving component configured to receive an overflow pool. The system further includes a database for storing information associated with a dynamic overflow pool allocation environment.

In yet another aspect, the present invention is directed to one or more computer readable media having instructions embodied thereon that, when executed, perform a method for managing a dynamically allocated overflow pool associated with a home agent. The method includes obtaining an overflow pool, monitoring for a new session registration request, and, upon receiving the new session registration request, determining whether an existing pool associated with the home agent has been exhausted. The method further includes assigning a home agent IP address from the overflow pool if it is determined that the existing pool has been exhausted.

Having briefly described an overview of embodiments of the present invention, an exemplary operating environment is described below.

Turning now to FIG. 1, a block diagram of an exemplary operating environment illustrating a dynamic overflow pool allocation implementation, in accordance with an embodiment of the present invention, is illustrated and designated generally with reference numeral 100. Exemplary operating environment 100 is shown with a wireless area 110, a wireless area 150, an overflow pool (OP) 130, and the Internet 140. Wireless area 110 includes a radio frequency (RF) area 112, a authentication, authorization, and accounting server (AAA) 114, a home agent (HA) 116 including an existing pool (EP) 118, and a mobile device 120. Mobile device 120 may have IP addresses, such as IP address 122, encoded into it. Wireless area 150 may be similar to wireless area 110. Wireless area 150 includes an RF area 152, a AAA 154, and a HA 156 including EP 158. Both wireless areas 110 and 150 may represent geographic areas such as cities, metropolitan areas, counties, etc. Different components may be included in wireless areas 110 and 150 than those that are shown. It will be understood and appreciated by one of ordinary skill in the art that the subset of devices illustrated here is intended for illustrative purposes to aid in the explanation of various embodiments of the present invention.

As previously discussed, a user having a mobile device, such as mobile device 120, may typically be associated with a first home agent in a first wireless area, such as home agent 156 in wireless area 150. When traveling, however, the user may wish to access the Internet while in a second wireless area, such as wireless area 110. The user could access the Internet using only the existing IP address pool associated with home agent 116 of wireless area 150. For example, home agent 116 will recognize that mobile device 120 is a non-local mobile device requesting a new session. If there is an available IP address in existing pool 118, home agent 116 will assign mobile device 120 with an IP address. If, however, there is a high capacity incident (e.g. a number of users whose typical wireless area is something other than wireless area 110 area attempting to access the Internet while in wireless area 110), the existing pool 118 may be quickly exhausted, leaving no available IP addresses for non-local mobile devices requesting a new session. For instance, a high capacity incident may occur during a large conference, convention, or sporting event. A high capacity incident may also be caused by typical business traffic, vacationers, or any other event that involves a large number of non-local users in a wireless area. The explanation of the existing pool approach has been simplified here to illustrate the inefficient and potentially ineffective results caused by using only a set of pre-determined IP addresses with a given wireless area. As can be seen from this discussion, during a high capacity event, congestion may occur in a wireless area, exhausting all available IP addresses in an existing pool and potentially preventing Internet access for some mobile devices seeking access to the network.

In the above example, a user seeking to access the Internet while traveling could also do so using dynamic overflow pool allocation. Instead of entirely exhausting the existing pool 118 associated with home agent 116, an overflow pool 130 will be available. For example, the overflow pool may be a pool of IP addresses that may be accessed by any home agent in any wireless area, when needed. Thus, when home agent 116 has sufficiently minimal available IP addresses, crossing a minimal threshold, home agent 116 may request access to overflow pool 130 for a temporary time period. In this example, overflow pool 130 will provide home agent 116 with more IP addresses, supplementing the IP addresses available in existing pool 118 for the duration of the high capacity event. Therefore, in this example, overflow pool 130 functions as a roaming pool of IP addresses, that may be accessed when existing pools in wireless networks, such as existing pool 118 on wireless network 110, are insufficient to meet consumer demands for Internet access.

Figure 2:
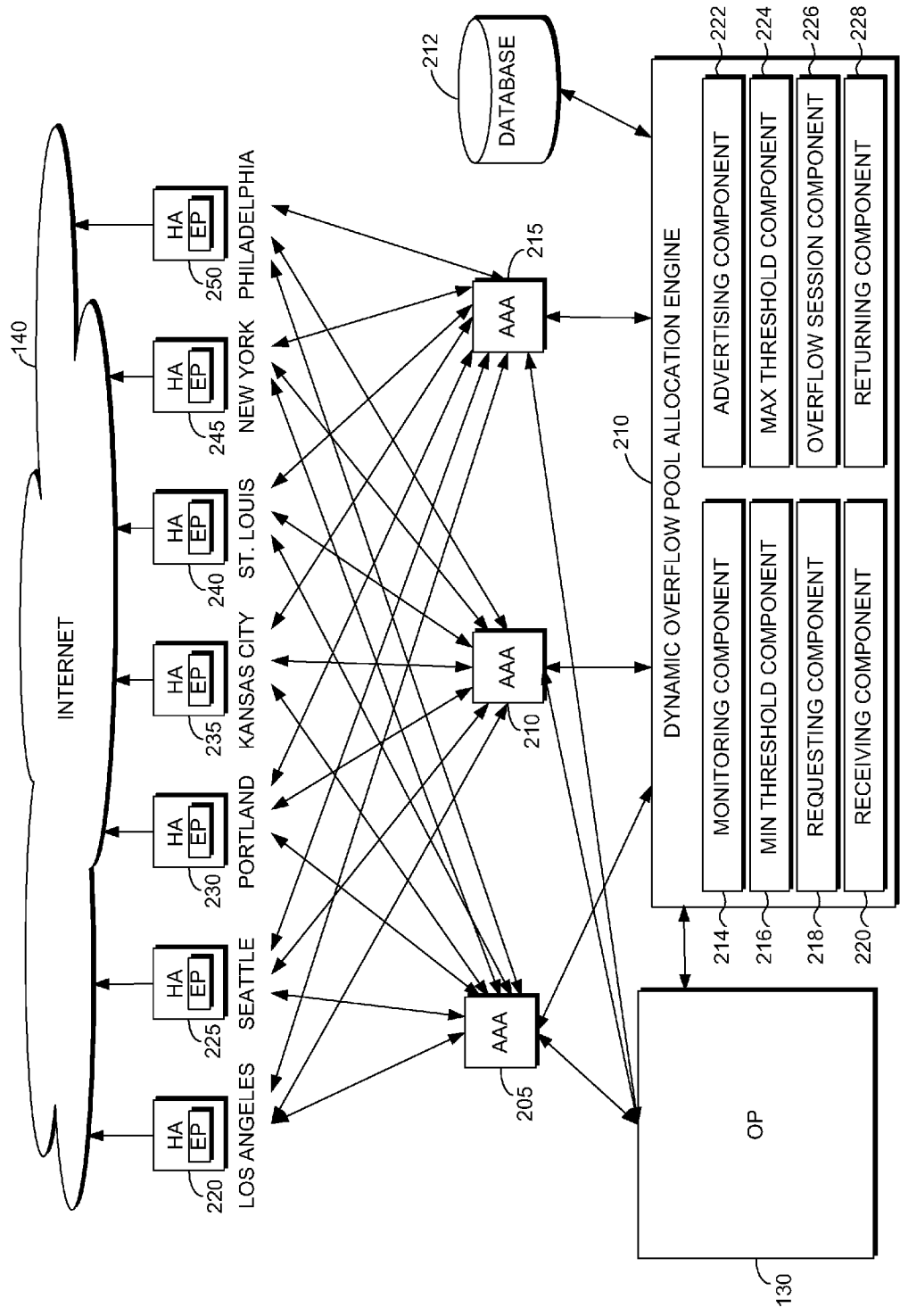
FIG. 2 is a block diagram illustrating an exemplary system for dynamic overflow pool allocation, in accordance with an embodiment of the present invention.

Turning now to FIG. 2, a block diagram illustrating an exemplary system for dynamic overflow pool allocation, in accordance with an embodiment of the present invention, is illustrated and designated generally as reference numeral 200. As illustrated various AAA servers 205, 210, and 215 are associated with various home agents, such as Los Angeles home agent 220, Seattle home agent 225, Portland home agent 230, Kansas City home agent 235, St. Louis home agent 240, New York home agent 245, and Philadelphia home agent 250. It will be understood and appreciated by one of ordinary skill in the art that the home agent and AAA server configuration of FIG. 2 are intended for illustrative purposes only and are in no way meant to limit the scope of the present invention to any particular server and home agent configuration. Rather, it is contemplated and within the scope of the present invention that various home agent and AAA server configurations are possible. For example, without limitation, there may be various home agents that are not shown. Further, each home agent may have a dedicated AAA server for communication.

Exemplary system 200 also includes an overflow pool (OP) 130, the Internet 140, a dynamic overflow pool allocation engine 210, and a database 212 in communication with one another via AAA servers 205, 210, and 215, and home agents 220, 225, 230, 235, 240, 245, and 250. Database 202 is configured to store information associated with a dynamic overflow pool allocation environment. In various embodiments, without limitation, such information may include the minimal and maximum threshold for various home agents, the number of IP addresses available on various home agents, a framed IP address and a framed IP netmask for the overflow pool, the number of IP addresses in the overflow pool currently being used, and various other types of information for use with dynamic overflow pool allocation engine 210. In various embodiments, database 202 is configured to be searchable so that dynamic overflow pool allocation engine 210 can retrieve information. It will be understood and appreciated by one of ordinary skill in the art that the information stored in database 202 may be configurable and may include various information relevant to a delegated pre-configuration. The content and/or volume of such information are not intended to limit the scope of embodiments of the present invention in any way. Further, though illustrated as a single, independent component, database 202 may, in fact, be a plurality of databases, for instance, a database cluster, portions of which may reside on a computing device associated with dynamic overflow pool allocation engine 210, associated with overflow pool 130, AAA servers 205, 210, and 215, on any of the home agents 220-250, on another external computing device (not shown), or any combination thereof. One of ordinary skill in the art will understand and appreciate that embodiments of the present invention are not limited to any particular database configuration.

Dynamic overflow pool allocation engine 210 may be a type of computing device, such as those described previously herein, and includes a monitoring component 214, a minimal threshold component 216, a requesting component 218, a receiving component 220, an advertising component 222, a maximum threshold component 224, an overflow session component 226, and a returning component 228. Though illustrated here as an isolated system component, portions or all of the functionality of dynamic overflow pool allocation engine 210 may be included within AAA servers 205, 210, and 215 and home agents 220-250. Stated differently, one of ordinary skill in the art will understand and appreciate that dynamic overflow pool allocation engine 210 is illustrated here as a single, isolated system component to simplify discussion but that, in various embodiments, portions or all of dynamic overflow pool allocation engine 210 may be incorporated within other illustrated system components or other devices that are not shown. The illustration in FIG. 2 is not intended to limit the scope of the present invention to any particular organizational scheme. Rather, it is intended and within the scope of the present invention that dynamic overflow pool allocation engine 210 may be implemented in a variety of ways in various embodiments to achieve compatibility and efficiency with various mobile IP networks.

Monitoring component 214 is configured to monitor for a new session registration request. In various embodiments, by way of example, a new session request is indicated with a particular IP address included in the home agent field of the request (e.g., {0.0.0.0}). Thus, in various embodiments, system 200 is in a steady state until a new session registration request is received. In various other embodiments, once a home agent has obtained an overflow pool, monitoring component 214 may be configured to monitor for a home agent event, the home agent event being a new session registration request or a mobile IP session termination. Thus, in various embodiments, without limitation, monitoring component 214 is used to maintain a steady state for system 200 until certain events occur. Upon the occurrence of those certain events, other components of dynamic overflow pool allocation engine 210 will be engaged to perform various other functionality as discussed in more detail herein.

Minimal threshold component 216 is configured to determine, upon receiving the new session registration request, an existing pool associated with a home agent has crossed below a minimal threshold. As previously discussed, in various embodiments, the use of an overflow pool may only necessary where there is a high capacity event, creating a significant demand for IP addresses allocated within an existing pool in a wireless network. Minimal threshold component 216 includes a set minimal number of available IP addresses in the existing pool necessary to effectively maintain a wireless network. Where the existing pool drops below the minimal threshold set, use of the overflow pool may be necessary and dynamic overflow pool allocation engine 210 will begin to adjust accordingly.

For instance, requesting component 218 is configured to request an overflow pool and receiving component 218 is configured to receive the overflow pool. Of course, in various embodiments, dynamic overflow pool allocation engine 210 will only request and receive an overflow pool if it is necessary based on a minimal threshold determination. One of ordinary skill in the art will understand and appreciate that requesting and receiving an overflow pool may be performed in a variety of ways. For instance, without limitation, a home agent may send a RADIUS request to a AAA server which, in turn, sends a request for the overflow pool. As previously stated, in various embodiments, the overflow pool may be a single pool of IP addresses entirely accessible by any of various home agents associated with a service provider. Thus, in these embodiments, when a home agent receives the overflow pool, other home agents would be prevented from access to the overflow pool until the original home agent had returned it. In various other embodiments, the overflow pool may include a variety of smaller pools, each including a number of IP addresses. Thus, in these embodiments, a home agent needing access to an overflow pool may only receive one smaller overflow pool, depending upon the needs of the home agent.

Advertising component 222 is configured to advertise the overflow pool to the routing protocol. For example, in various embodiments, before a home agent can utilize a newly accessed overflow pool, the home agent and the overflow pool may need configuration to correctly route data packets. Advertising 222 is able to accomplish this configuration in various embodiments. It will be understood and appreciated by one of ordinary skill in the art that any other rules associated with the home agent may be modified, if necessary to correctly route traffic to the overflow pool.

As previously stated, once dynamic overflow pool allocation engine 210 has obtained an overflow pool, a second steady state exists with monitoring component 214 monitoring for a home agent event such as a new session registration request or a mobile IP session termination. In various embodiments, without limitation, the use of available IP addresses are monitored by dynamic overflow pool allocation engine 210 to determine an appropriate time for returning the overflow pool. For instance, maximum threshold component 224 is configured to determine whether the existing pool has crossed a maximum threshold. Functioning as a complement to minimal threshold component 216, maximum threshold component 224 determines when there is sufficient capacity in a home agent's existing pool such that the overflow pool is no longer needed to support consumer demands. In various embodiments, without limitation, the minimal threshold and maximum threshold are set sufficiently far apart so that dynamic overflow pool allocation engine 210 is not constantly toggling between obtaining an overflow pool and returning an overflow pool. Much like a thermostat, in various embodiments, without limitation, the minimal and maximum thresholds are set far enough apart so that dynamic overflow pool allocation engine 210 will remain "on" (i.e. obtaining an overflow pool) or "off" (i.e. returning an overflow pool).

In various embodiments, however, regardless of the status of the existing pool, the overflow pool may not be available for return from the home agent where a mobile user is assigned to an IP address from the overflow pool. In various embodiments, as the demand for IP addresses decreases after a peak requiring an overflow pool, newly requested IP addresses are assigned from the existing pool and not the overflow pool so that the overflow pool will eventually be in condition for return. Thus, overflow session component 226 is configured to, if it is determined that the existing pool has crossed a maximum threshold, determine whether at least one session remains using the overflow pool. Stated differently, if overflow session component 226 determines that no sessions remain using an IP address associated with the overflow pool, the overflow pool will be ready to return, assuming the available IP addresses in the existing pool remain above the maximum threshold.

Returning component 228 is configured to, if it is determined that no session remain using the overflow pool, send a request to a AAA server using RADIUS requesting release of the overflow pool. Thus, an overflow pool may be released on two conditions: (1) the existing pool remains above the maximum threshold; and (2) there are no IP addresses from the overflow pool currently in use. Upon the satisfaction of both conditions, dynamic overflow pool allocation engine 210 will return the overflow pool, creating accessibility for other home agents.

Figure 3:
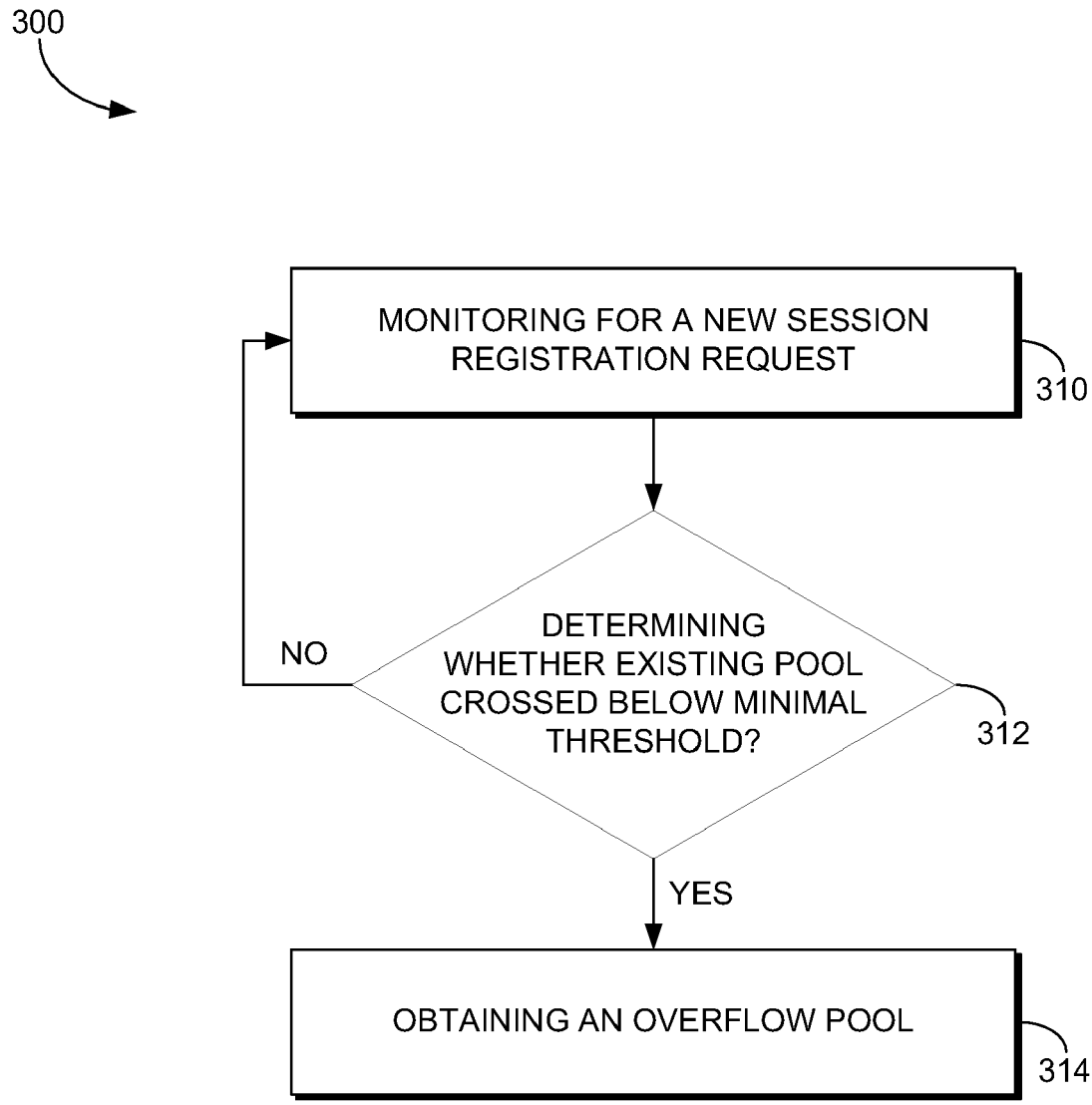
FIG. 3 is a flow diagram illustrating an exemplary method for dynamic overflow pool allocation, in accordance with an embodiment of the present invention.

Turning now to FIG. 3, a flow diagram of an exemplary method for dynamic overflow pool allocation, in accordance with an embodiment of the present invention, is illustrated and designated generally as reference numeral 300. Initially, as indicated at block 310, a new session registration request is monitored for, e.g., by monitoring component 214 of FIG. 2. By way of example, without limitation, in various embodiments the mobile IP registration request may include a home agent field of {0.0.0.0}, indicating a new session is desired.

Next, as indicated at block 312, it is determined whether the existing pool associated with the home agent crossed below the minimal threshold, e.g., by minimal threshold component 216 of FIG. 2. For example, as previously stated, without limitation, where the home agent does not have a sufficient amount of available IP addresses, the minimal threshold will be crossed. If it is determined that the minimal threshold is not crossed, the method returns to block 310 and continues monitoring for new session registration requests. If, however, it is determined that the minimal threshold is crossed, an overflow pool is obtained (e.g., utilizing requesting component 218 and receiving component 220 of FIG. 2), as indicated at block 314. As previously discussed the overflow pool is available for multiple home agents when necessary. In various embodiments, without limitation, the home agent may access the entire overflow pool during the high capacity incident necessitating access to the overflow pool. In various other embodiments, without limitation, the overflow pool is broken into smaller pools and the home agent may have access to one or more of the smaller overflow pools when needed.

Figure 4:
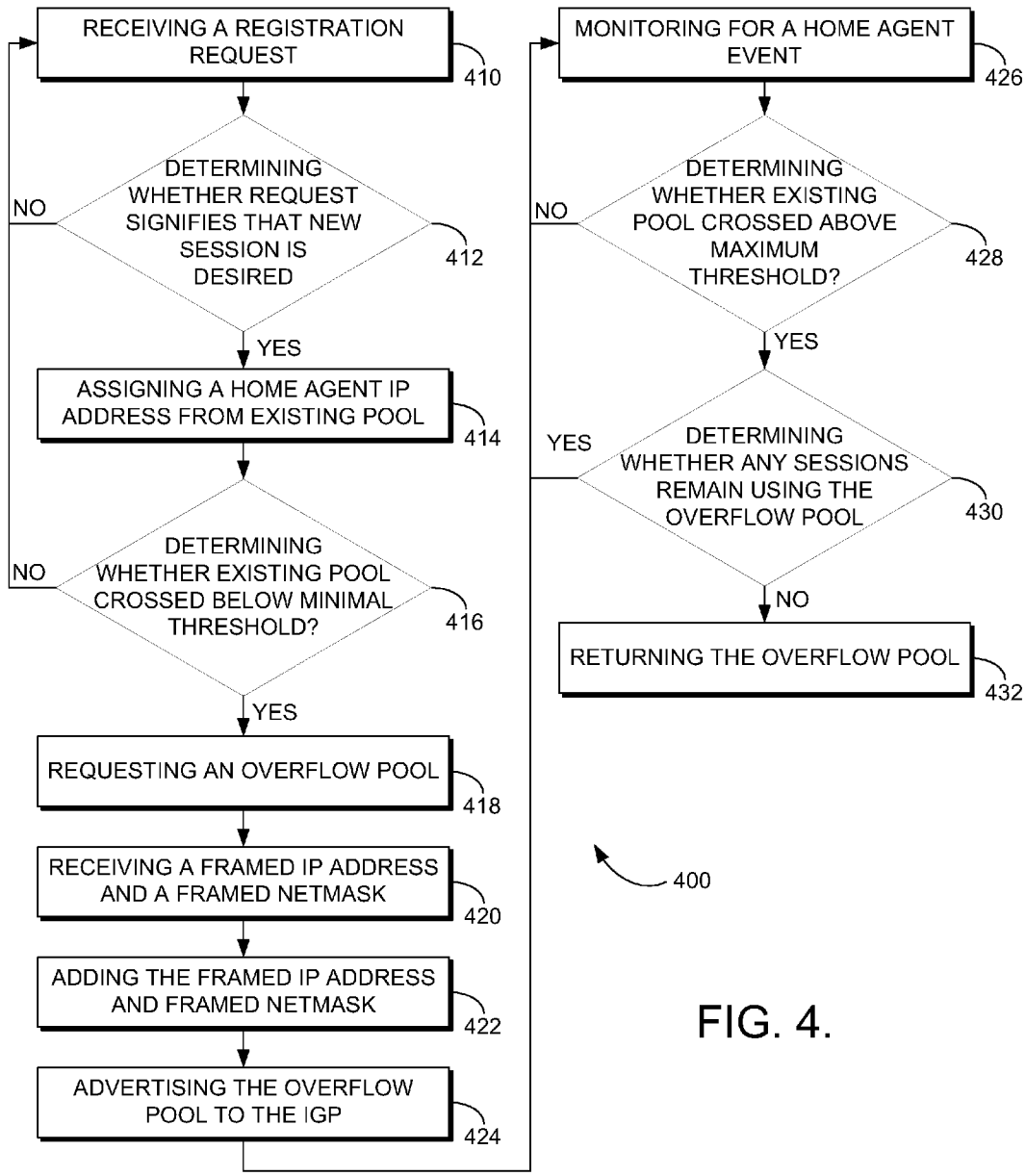
FIG. 4 is a flow diagram illustrating an exemplary method for dynamic overflow pool allocation, the method having more detail than the method in FIG. 3, in accordance with an embodiment of the present invention.

Turning now to FIG. 4, a flow diagram of an exemplary method for dynamic overflow pool allocation, the method having more detail than the method in FIG. 3, in accordance with an embodiment of the present invention, is illustrated and designated generally as reference numeral 400. Initially, as indicated at block 410, a first registration request is received, e.g., by monitoring component 214 of FIG. 2. In various embodiments, without limitation, the registration request may or may not be a request for a new session. For instance, the mobile device requesting registration may already have an assigned IP address, in which case it is not in need of a new IP address. New session requests, however, will require assignment of an IP address. Thus, as indicated at block 412, it is determined whether the request signifies that new session is desired. As previously discussed with reference to FIGS. 2 and 3, in various embodiments, a new session request may be indicated using the home agent field such as by setting the field to the IP address {0.0.0.0}. If it is determined that a new session is desired, the mobile device is assigned a home agent IP address from an existing home agent pool, as indicated at block 414. If, however, it is determined that a new session is not desired, the method returns to step 410 and waits to receive a registration request.

Next, as indicated at block 416, it is determined whether the existing pool crossed below a minimal threshold, e.g., by minimal threshold component 216 of FIG. 2. If the existing pool did not cross below the minimal threshold, the method returns to the steady state at block 410, waiting to receive a registration request. If, however, it is determined that the existing pool did cross below the minimal threshold, an overflow pool is requested as indicated at block 418. For example, without limitation, in various embodiments of the present invention the home agent sends a RADIUS request to the AAA server requesting an overflow pool.

Next, as indicated at block 420, a framed IP address and a framed netmask are received, e.g., by receiving component 220 of FIG. 2. For example, without limitation, in various embodiments the framed IP address and the framed netmask indicate to the home agent where to access the overflow pool. Then the method adds the framed IP address and the framed netmask, as indicated at block 422 and, at step 424, the method advertises the overflow pool to the routing protocol, e.g., utilizing advertising component 222 of FIG. 2. For instance, without limitation, in various embodiments, the overflow pool must be advertised to the routing protocol to ensure that data packets are correctly routed between various mobile devices and overflow pool IP addresses.

Once the overflow pool has been received and configured, the method enters another steady state, as indicated at block 426, and monitors for a home agent event, e.g., with monitoring component 214 of FIG. 2. At block 428 it is determined whether the existing pool crossed above the maximum threshold, e.g., using maximum threshold component 224 of FIG. 2. As previously stated, in various embodiments, the maximum threshold indicates that the home agent is able to effectively compensate for any increased traffic associated with a high capacity instance, suggesting that the home agent no longer needs to utilize the overflow pool to maintain service. Stated differently, when the existing pool crosses below a minimal number of available IP addresses, an overflow pool may be necessary to provide service and steps are taken, as previously discussed, to provide the home agent access to an overflow pool. In various embodiments, however, it would be inefficient to allow a home agent to monopolize an overflow pool unnecessarily. Therefore, when the existing pool has a sufficiently high number of available IP addresses, steps are taken to return the overflow pool, as will be further discussed herein. Thus, if it is determined that the existing pool is not above the maximum threshold, the method returns to the steady state at step 426 and monitors for a home agent event.

If, however, it is determined that the existing pool has crossed above the maximum threshold, it is determined whether any sessions remain using the overflow pool, as indicated at step 430, e.g., with overflow session component 226 of FIG. 2. By way of example, without limitation, in various embodiments, the overflow pool may not be returned until no mobile devices are using IP addresses associated with the overflow pool. Accordingly, in various embodiments, dynamic overflow pool allocating demonstrates a preference for the existing pool and assigns existing pool IP addresses where available, freeing up the overflow pool if it is not needed. Thus, if it is determined that session remain on the overflow pool, the method returns to the steady state at step 426 and monitors for a home agent event. If it is determined, however, that no remaining mobile devices are using IP addresses associated with the overflow pool, the overflow pool is returned, as indicated at step 432, e.g., using returning component 228 of FIG. 2. Once the overflow pool has been returned, in various embodiments, other home agents may access the overflow pool, if necessary. As will be understood and appreciated by one of ordinary skill in the art, the present method allows a home agent to utilize an overflow pool if necessary, but prevents the home agent from unnecessarily monopolizing an overflow pool.

Figure 5:
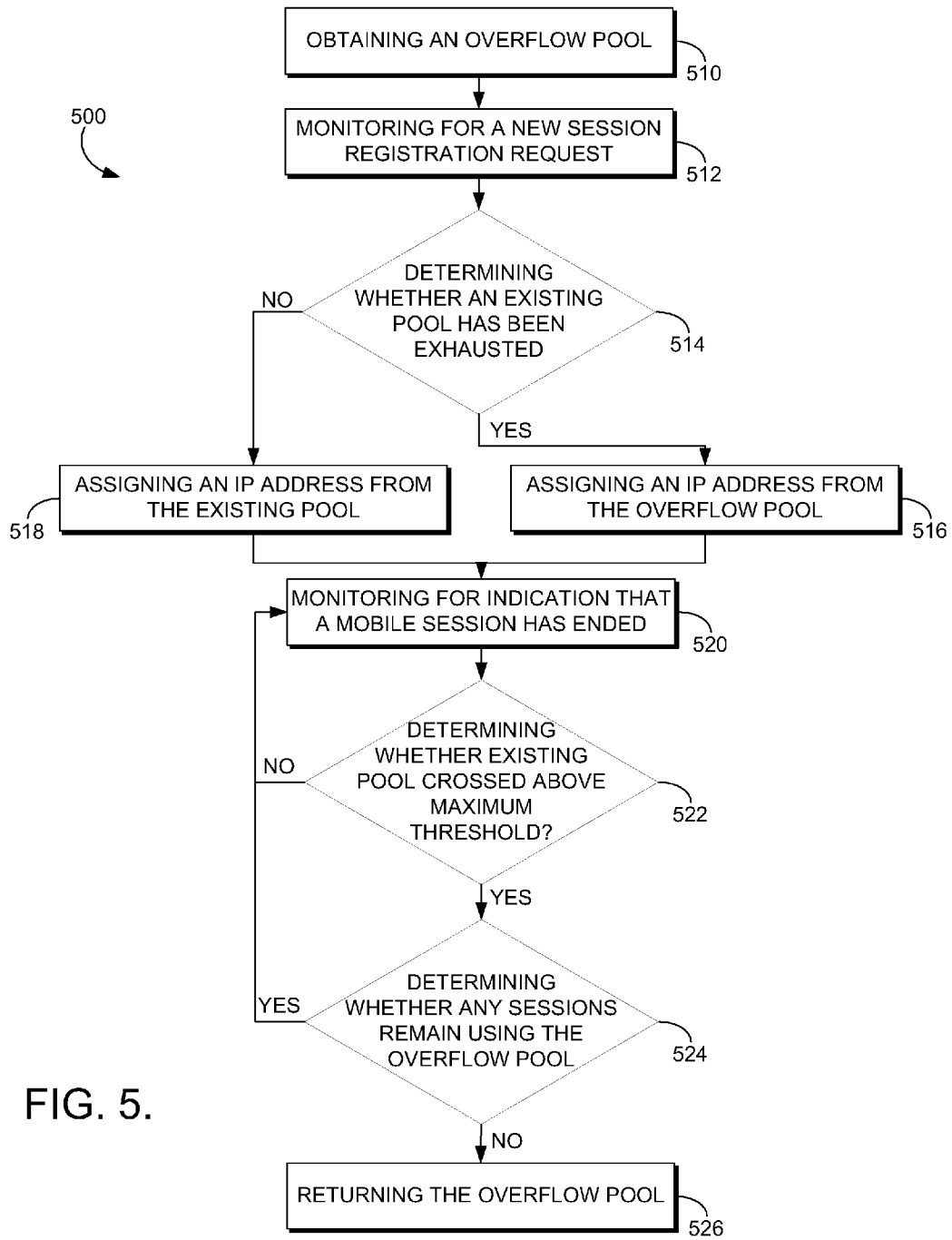
FIG. 5 is a flow diagram illustrating an exemplary method for releasing a dynamically allocated overflow pool, in accordance with an embodiment of the present invention.

Turning now to FIG. 5, a flow diagram of an exemplary method for releasing a dynamically allocated overflow pool, in accordance with an embodiment of the present invention, is illustrated and designated generally as reference numeral 500. Initially, as indicated at block 510, an overflow pool is obtained, e.g., as previously discussed with reference to FIGS. 2-4. Next, as indicated at block 512, the method monitors for a new session registration request. As previously stated, in various embodiments, not all registration requests are necessarily new session registration requests and the request may indicate to the home agent whether or not it desires a new session. Next, as indicated at block 514, it is determined whether an existing pool has been exhausted. If an existing pool has been exhausted, the new session registration request will be assigned an IP address assignment from the obtained overflow pool, as indicated at block 516. If, however, the existing pool has not been exhausted, the registration request will be assigned an IP address from the existing pool, as indicated at block 518. Thus, as previously stated with reference to FIG. 4, in various embodiments of the present invention, the method demonstrates a preference for utilizing the existing pool, if available. By granting preference to the existing pool, the method only assigns, in various embodiments, without limitation, IP addresses associated with the overflow pool when necessary. Therefore, in these embodiments, the overflow pool may be released if it is not needed by the home agent, preventing the home agent from monopolizing the overflow pool unnecessarily.

Next, as indicated at block 520, the method monitors for an indication that a mobile session has ended. As will be understood and appreciated by one of ordinary skill in the art, mobile IP sessions are constantly being requested and terminated. Thus, when mobile IP sessions are terminated, it may free previously busy IP addresses that can be subsequently assigned. Therefore, as indicated at block 522 it is determined whether the existing pool crossed above the maximum threshold. As previously discussed with reference to FIG. 4, if the existing pool has not crossed above the maximum threshold, the method returns to the steady state, here block 520. If, however, the existing pool has crossed above the maximum threshold, it is determined whether any sessions remain using the overflow pool as indicated at block 524 and as previously discussed with reference to FIG. 4. If one or more sessions remain utilizing IP addresses associated with the overflow pool, the method returns to step 520. If no overflow pool session remain, the overflow pool is returned, as indicated at block 526.

In each of the exemplary methods described herein, various combinations and permutations of the described blocks or steps may be present and additional steps may be added. Further, one or more of the described blocks or steps may be absent from various embodiments. It is contemplated and within the scope of the present invention that the combinations and permutations of the described exemplary methods, as well as any additional or absent steps, may occur. The various methods are herein described for exemplary purposes only and are in no way intended to limit the scope of the present invention.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to obtain the ends and objects set forth above, together with other advantages which are obvious and inherent to the methods, computer-readable media, and systems. It will be understood that certain features and sub-combinations are of utility and may be employed without reference to other features and sub-combinations. This is contemplated by and within the scope of the claims.

What is claimed is:

1. A method in a mobile IP environment for dynamically allocating an overflow pool to a home agent, comprising:
   monitoring for a new session registration request;
   upon receiving the new session registration request, determining whether an existing pool associated with the home agent has crossed below a minimal threshold; and
   if it is determined that the existing pool has crossed below the minimal threshold, obtaining the overflow pool,
   wherein obtaining the overflow pool comprises:
      requesting the overflow pool; and
      receiving access to the overflow pool, wherein receiving access to the overflow pool further comprises:
         receiving a framed IP address and a framed IP netmask associated with the overflow pool;
         adding the framed IP address and framed IP netmask, allowing the home agent access to the overflow pool;
         advertising the overflow pool to a routing protocol;
         monitoring for a home agent, event;
         upon receiving the home agent event,
            determining whether available IP addresses in the existing pool has crossed a maximum threshold;
            if it is determined that the available IP addresses in the existing pool has crossed the maximum threshold,
               determining whether at least one session remains using at least one of the available IP addresses in the overflow pool; and
            if it is determined that no sessions remain using at least one available IP addresses in of the overflow pool,
               returning the overflow pool.

2. The method of claim 1, wherein monitoring for a new session registration request comprises:
   receiving a first registration request;
   determining whether the first registration request signifies that a new session is desired; and
   if it is determined that the first registration request signifies that the new session is desired, assigning a home agent IP address from the existing pool.

3. The method of claim 2, wherein a home agent field associated with the registration request includes a home agent IP address of 0.0.0.0, signifying that a new session is desired.

4. The method of claim 1, wherein the overflow pool is requested from an authentication, authorization, and accounting server using remote authentication dial-in user service.

5. The method of claim 1, wherein returning the overflow pool comprises:
   sending a request to an authentication, authorization, and accounting server using remote authentication dial-in user service requesting release of the overflow pool.

6. The method of claim 5, wherein the home agent event includes at least one of a second registration request and an indication that a mobile session has ended.

7. A computerized system in a mobile IP environment for dynamic overflow pool allocation, the system comprising:
   a monitoring component configured to monitor for a new session registration request;
   a minimal threshold component configured to determine, upon receiving the new session registration request, whether an existing pool associated with a home agent has crossed below a minimal threshold;
   a requesting component configured to request an overflow pool;
   a receiving component configured to receive the overflow pool;
   a maximum threshold component configured to determine whether the available IP addresses in the existing pool has crossed a maximum threshold;
   an overflow session component configured to prepare the overflow pool for return when one or more sessions that use one or more of the available IP addresses of the overflow pool reaches zero; and
   at least one database for storing information associated with a dynamic overflow pool allocation environment.

8. The system of claim 7, wherein the receiving component is further configured to receive a framed IP address and a framed IP netmask associated with the overflow pool and add the framed IP address and the framed IP netmask, allowing the home agent access to the overflow pool.

9. The system of claim 8, further comprising:
   an advertising component configured to advertise the overflow pool to a routing protocol.

10. The system of claim 9, wherein the monitoring component is further configured to monitor for a home agent event.

11. The system of claim 10, further comprising:
   an overflow session component configured to, if it is determined that the existing pool has crossed the maximum threshold, determine whether at least one session remains using the overflow pool.

12. The system of claim 11, further comprising:
a returning component configured to, if it is determined that no sessions remain using the overflow pool, send a request to an authentication, authorization, and accounting server using remote authentication dial-in user service requesting release of the overflow pool.

13. One or more non-transitory computer readable media having instructions embodied thereon that, when executed, perform a method in a mobile IP environment for managing a dynamically allocated overflow pool associated with a home agent, the method comprising:
obtaining an overflow pool;
monitoring for a new session registration request;
upon receiving the new session registration request,
determining whether an existing pool associated with the home agent has been exhausted;
if it is determined that the existing pool has been exhausted, assigning a home agent IP address from the overflow pool; and
monitoring for a home agent, event,
upon receiving the home agent event,
determining whether available IP addresses in the existing pool has crossed a maximum threshold;
if it is determined that the available IP addresses in the existing pool has crossed the maximum threshold, determining whether at least one session remains using one or more available IP addresses of the overflow pool; and
if it is determined that no sessions remain using the one or more available IP addresses of the overflow pool,
returning the overflow pool.

14. The computer readable media of claim 13, further comprising:
if it is determined that the existing pool has not been exhausted, assigning a home agent IP address from the existing pool.

15. The computer readable media of claim 13, wherein returning the overflow pool comprises:
sending a request to an authentication, authorization, and accounting server using remote authentication dial-in user service requesting release of the overflow pool.

* * * * *